United States Patent [19]
Mackal et al.

[11] 3,831,629
[45] Aug. 27, 1974

[54] CHECK VALVE

[75] Inventors: Glenn H. Mackal, Saddle River; George E. Lardner, Hawthorne, both of N.J.

[73] Assignee: Halkey-Roberts Corporation, Paramus, N.J.

[22] Filed: Jan. 24, 1972

[21] Appl. No.: 219,974

[52] U.S. Cl. ............ 137/525, 137/535, 137/DIG. 4
[51] Int. Cl. ............................................. F16k 15/14
[58] Field of Search ........... 137/525, 528, 535, 540, 137/533.17, DIG. 4; 251/149.7

[56] References Cited
UNITED STATES PATENTS

| | | | |
|---|---|---|---|
| 173,318 | 2/1876 | McCarty | 137/533.17 |
| 1,640,408 | 8/1927 | House | 137/533.17 X |
| 2,270,838 | 1/1942 | Langdon | 137/DIG. 4 |
| 3,192,949 | 7/1965 | De See | 137/540 |
| 3,385,301 | 5/1968 | Harautuneian | 137/525 X |
| 3,513,875 | 5/1970 | Nelson | 137/528 |

*Primary Examiner*—Robert G. Nilson
*Attorney, Agent, or Firm*—Alfred W. Vibber

[57] ABSTRACT

Two-piece check valve having a sleeve-like valve body and a valve element reciprocable therewithin, the valve element having an elastomeric rear end portion integral therewith which is held in axial compression, whereby constantly to urge the valve element forwardly toward valve-closed position. The rear end of the valve body is crimped radially inwardly to form a fluid-passing abutment for the rear end portion of the valve element. The valve also incorporates a novel means for guiding the valve element for reciprocation within the valve body, while maintaining it concentric with respect thereto.

5 Claims, 10 Drawing Figures

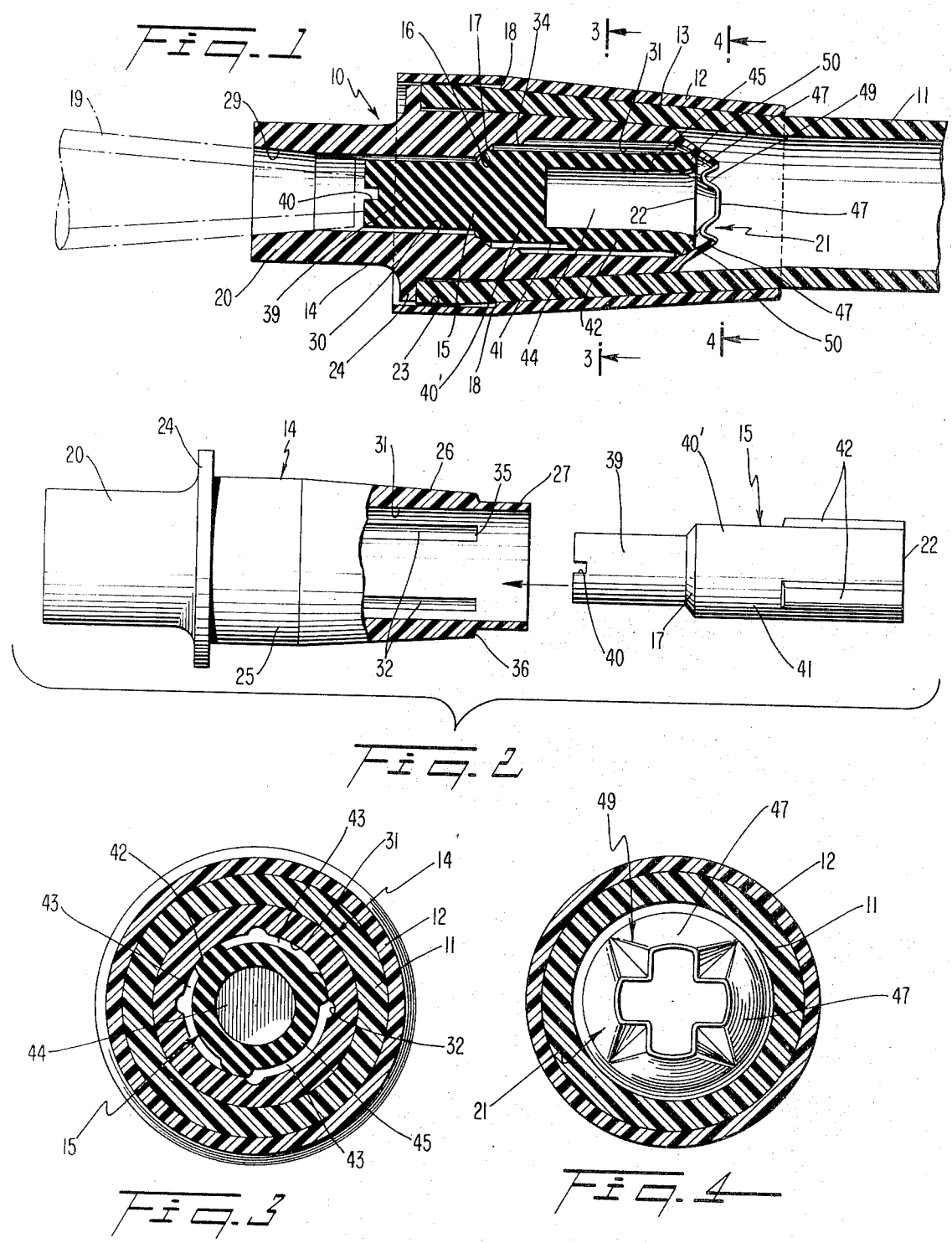

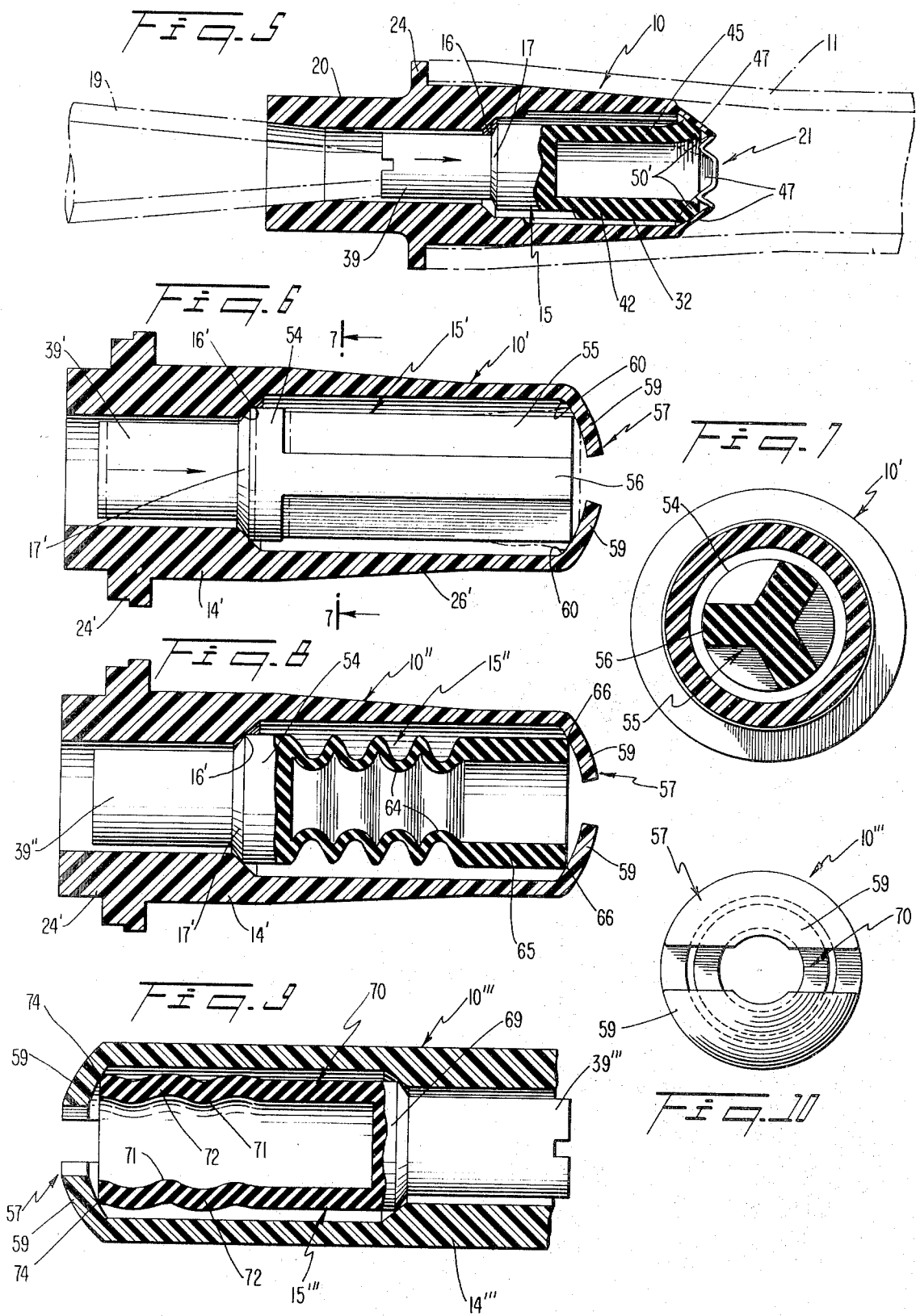

CHECK VALVE

This invention relates to a check valve. More particularly, the check valve is of simplified construction, made in two pieces: (1) a sleeve-like valve body, and (2) a valve element reciprocable therewithin, the valve element having an elastomeric rear end portion which is integral therewith and which is held in axial compression whereby constantly to urge the valve element toward valve-closed position.

Although not limited thereto, the check valve of the invention is well suited to use in applications in which it is subjected to low fluid pressures. Among such uses is that in a catheter wherein the valve prevents the escape of water from an inflated catheter-retaining balloon or bulb on the inner end of the catheter.

One prior check valve used for this purpose was made in three pieces: a valve body, a reciprocable valve element therewithin, and a foamed porous elastomeric plastic body held under compression between an abutment on the rear end of the valve body and the rear end of the valve element. This valve presented difficulties in assembly, and the foamed plastic body undesirably obstructed the flow of fluid through the valve.

Another prior valve adapted for the same use was of two-piece construction, the valve element having a valve spring integral therewith. Such spring, however, was made in the form of a plurality of equally angularly spaced helical plastic spring elements integrally connected to the valve element proper at their forward ends and connected together and compressively engaging an abutment at the rear end of the valve body. The inner, valve element of this embodiment was difficult to mold; more importantly, the helical spring elements became tangled with those of other valve elements when the valve elements were placed in the hopper of an automatic valve assembling machine, and so such valves had to be assembled by hand. Even then, the configuration of the valve elements made it difficult to separate them after they had been stored together in any great quantity.

The two-piece check valve of the invention is particularly characterized by the simplicity of external configuration of the valve element, making the valve ideally suited to machine assembly. Such configuration of the valve element, taken with the novel crimped formation which constitutes the valve element-engaging abutment on the rear end of the valve body, provides a generally straight-line path of fluid flow of very substantial total cross sectional area through the valve when the valve is open. The crimped abutment on the rear end of the valve body is formed in a novel manner at ambient temperature.

The valve of the invention also incorporates novel means for guiding the valve element for longitudinal reciprocation within the valve body, while maintaining the two concentric with respect to each other.

The above and further objects and novel features of the invention will more fully appear from the following description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views:

FIG. 1 is a view in axial cross-section through the assembled valve, rubber tube, and sleeve or cap, the tapered nozzle of an inflation syringe being shown partially inserted into the left or forward end of the valve body;

FIG. 2 is a view partially in elevation and partially in section of the valve body and of the inner valve element or poppet about to be inserted therein;

FIG. 3 is a view in cross-section through the assembled valve tube and cap, the section being taken along the line 3—3 of FIG. 1;

FIG. 4 is a view in cross-section taken along the line 4—4 of FIG. 1;

FIG. 5 is a view similar to FIG. 1 of the valve per se with the valve poppet urged rearwardly into an open position as by the nozzle of a syringe;

FIG. 6 is a view partially in axial section and partially in elevation of a first alternative embodiment of the valve;

FIG. 7 is a view in cross-section through the valve of FIG. 6, the section being taken along the line 7—7 of FIG. 6;

FIG. 8 is a view partially in axial section and partially in side elevation of a second alternative embodiment of the valve of the invention;

FIG. 9 is a view partially in side elevation and partially in axial section of a third alternative embodiment of the valve of the invention; and FIG. 10 is a view in rear end elevation of the valves of any of FIGS. 6, 8, and 9.

As will be apparent from the above, four embodiments of the valve in accordance with the invention are shown. The first such embodiment is shown in FIGS. 1–5, inclusive; the second embodiment is shown in FIGS. 6, and 7; and a third embodiment is shown in FIG. 8. The fourth embodiment is shown in FIGS. 9 and 10. Although the illustrative embodiments of the invention are particularly described herein as being used as check valves in a catheter, it is to be understood that the valve is useful in a number of other applications, as will become apparent from the following descriptions.

Turning now to the first embodiment of the valve shown in FIGS. 1–5, inclusive, the check valve there shown, which is generally designated by the reference character 10, is telescopically received within and sealed to the outer end of a rubber or rubber-like tube 11 which, in this instance, is the branch or inflation tube of a catheter. The valve is securely retained within the tube 11 in the position shown by a frusto-conical retaining sleeve or cap 12 which is telescoped thereover.

The valve 10 has a body 14 presenting a central axial passage therethrough and a longitudinally reciprocable valve element or poppet 15 which is mounted within such passage in the valve body. The passage through the valve body 14 has a forwardly (to the left, FIG. 1) converging frusto-conical seat 16 on the inner wall thereof, seat 16 cooperating with an annular frusto-conical seat 17 on the valve element 15. Means to be described constantly urges the valve element 15 forwardly toward the position in which the valve seats 16 and 17 are in sealing engagement. The valve element 15 may be thrust rearwardly (to the right) as by engaging the forward end of the valve element with a suitable member inserted within the valve body. The valve element may also be urged to the right by the pressure of a liquid such as water which is pumped into the valve through a nozzle 19 which may be the nozzle of a syringe (not shown).

The body 14 of the valve has a forward, hood portion 20, and an annular transverse flange 24 rearwardly of such hood portion. Rearwardly of flange 24 the body has a portion with a relatively short circular cylindrical outer surface 25; rearwardly of the zone 25 the outer body has a relatively longer portion with a rearwardly shallowly converging frusto-conical outer surface 26. The unassembled valve body (FIG. 2) is completed by a relatively thin-walled circular cylindrical portion 27 which is joined to the portion of the body forwardly thereof by a relatively steep annular shoulder 36 as shown.

In the embodiment shown, the body 14 of the valve is made from polypropylene, and thus is slightly resilient. The hood 20 of the body has a frusto-conical passage 29 therein shallowly converging to the rear so as to make sealing engagement with different lengths of tapered syringe nozzles 19, the yielding of the hood 20 insuring such sealing engagement. Rearwardly of the frusto-conical surface 29 the valve body has a circular cylindrical passage portion 30 which lies forwardly of the above-described transverse annular valve seat 16 on the valve body. Rearwardly of the valve seat 16 the valve body has a larger diametered generally circular cylindrical passage 31 therethrough. As shown most clearly in FIGS. 2 and 3, the passage 31 has a plurality (four shown) of equally angularly spaced longitudinally extending grooves 32 therein, each such groove 32 extending rearwardly from a forward end 34 somewhat to the rear of the valve seat 16 to an end 35 which, in the embodiment shown, lies substantially at the transverse location of the shoulder 36 on the valve body.

The valve element or poppet 15 is in this instance made of neoprene and has a durometer rating on the Shore A Scale of 55 ± 5. It is to be understood that other rubber or rubber-like materials of the desired elasticity or resilience may be employed for the valve element 15, and that the hardness or durometer rating of such material may differ widely, depending upon the desired characteristics of the valve.

As shown most clearly in FIG. 2, the valve element or poppet 15 has a forward circular cylindrical portion 39 of reduced diameter; portion 39 is provided with a cross-slot 40 to provide for the lateral escape of liquid such as water from the forward end of the syringe nozzle into the annular channel presented between the portion 39 of the valve element and the portion 30 of the passage through the valve body. The above-described valve seat 17 joins the rear end of the surface 39 of the valve element with a rear larger diametered circular cylindrical portion 40' having a generally cylindrical surface 41. As shown in FIGS. 2 and 3, the rear end of the valve element 15 is provided with a plurality of equally angularly spaced axially extending ribs or lands 42 (three shown). Lands 42 have a circumferential width which markedly exceeds the circumferential width of the grooves 32 in the passage through the valve body, so that no matter how the valve element 15 is disposed angularly with respect to the valve body, there are always three at least substantially equally angularly spaced zones of substantial width of contact between the inner wall of the valve body and the outer surfaces of the lands. If one land 42 should overlie one of the grooves 32 there would still remain three unobstructed grooves 32. Thus an adequate path between the fall of the longitudinal passage through the valve body and the valve element is always present regardless of the relative angle of disposition of said two members with respect to each other. As shown, the surface 41 of the valve element is of substantially less diameter than the surface 31 of the passage through the valve body, whereby the present three part-sleeve-like passages 43 between the surface 41 of the valve element and the surface 31 of the valve body.

As above-indicated, the force by which the valve element is constantly yieldingly urged forwardly toward valve-closed position is derived from the valve element 15 itself. Thus in the embodiment of FIGS. 1–5, inclusive, such valve element has in the rear end thereof a blind circular cylindrical axial passage 44 therein which is open to its rear end. The rear end of the valve element exists as a sleeve 45 having a circular cylindrical inner wall and a generally circular cylindrical outer wall parallel to the inner wall, the outer wall having the lands 42 thereon. The valve element 15 is held in place in the valve body with the valve element constantly urged toward the left (FIG. 1) by a crimped or folded wall structure generally designated 21 which is formed from the thin-walled rear end portion 27 of the valve body after the valve element 15 has been assembled therein by inserting it into the valve body in the direction of the arrow in FIG. 2.

With the assembled valve body and valve element suitably supported in a fixture, as by resting upon the flange 24 and with the rear end of the valve body disposed upwardly, the rear or upper end of the portion 27 of the valve body is engaged by a coaxially disposed downwardly travelling crimping or folding tool having a concave lower end, such lower end surface being four projecting sleeve-indenting edges disposed in diametral planes disposed at 90° with respect to each other. Such edges produce a crimped formation, generally designated 21, on the sleeve portion 27, formation 21 being composed of four part-circular rearwardly converging frusto-conical crimped or folded wall portions 47 which overlie and compressively engage the outer rim of the rear end surface 22 of the valve element 15.

In order to accommodate the circumferential length of the sleeve 27 at the radially inner portion thereof, such sleeve is distorted to form four equally angularly spaced individual crimps 49 which are generally V-shaped and point forwardly of the valve as shown in FIG. 1. Such crimp 49 is disposed between a frusto-conical panel portion 47 and its next adjacent panel portion as shown in FIG. 4. The thus-described crimping of the sleeve 27 takes place at ambient temperatures; by reason of the fact that the sleeve 27 has been distorted in various places all beyond its elastic limit, the crimped formation 21 thus formed is permanent in nature.

The lengths of the various parts of the valve body and valve element and the axial extent of crimping of the sleeve 27 in the manner described are such that when the valve element is in closed position as shown in FIG. 1, the zones 50 of the rear end surface 22 of the valve element engaged by the panel portions 47 of the valve body are slightly deformed. In valves requiring only a slight valve-closing biasing force, this is generally sufficient. However, a deeper crimp will result not only in the deformation of the zones of contact 50, but also a slight waving of the side wall 45 of the rear portion of the valve element, thereby adding to the valve-closing force.

In FIG. 5 the valve element 15 is shown as being thrust to the right, thereby to open a space between the valve seats 16 and 17, as by the insertion of the nozzle 19 of a liquid-injecting syringe into the forward end of the valve body. Liquid under pressure is then pumped through the syringe nozzle through the annular space presented between the forward portion 39 of the valve element and the passage 30 through the valve body and thence rearwardly of the valve through the part-sleeve-like passages 43 between the valve element and valve body and thence out through the grooves 32 and the open structure of the crimp 21.

The above-described sleeve or cap 12 prevents the axial separation of the valve 10 and the tube 11. Thus after the tube 11 has been telescoped over the valve body so that the forward end thereof contacts the rear surface of the flange 24, the retaining sleeve 12 is telescoped over the tube 11 and is thrust therealong into the terminal position thereof shown in FIG. 1. In such position, the frusto-conical inner surface 13 of the sleeve 12 forcibly and intimately contacts the outer surface of the tube 11 which it engages, surface 13 being of the same or slightly different apex angle as the surface 26 of the valve body. At the forward end of surface 13 of the sleeve 12 there is provided a sharp annular inner shoulder 18 which connects the surface 13 to a circular cylindrical inner forward surface 23 on the sleeve 12. Locking together of the sleeve, tube, and valve body depends on three factors working separately and together: the taper fit between the body and the sleeve, the stretching of the sleeve to provide additional tightness; and compression or "squashing" of the rubber tubing between the body and the sleeve to provide additional tightness. Any attempt to pull the valve 10 forwardly out of the tube 11 only causes the tube to be gripped more forcibly between the valve body and the sleeve 12.

The embodiment of the valve shown in FIGS. 6 and 7 is in general similar to that above-described, with the exceptions that it has no forward portion or hood 20 thereon, a different type of crimp structure is employed, and the valve element or poppet thereof is of a construction different from that of the first embodiment. For simplicity, in the valve 10' of FIGS. 6 and 7, the same reference characters with added primes are employed for parts which are similar to those of the first-described embodiment.

The valve element 15' has a head portion 54 which is of plug-like shape, member 54 having on its forward outer edge a frusto-conical valve seat 17' which cooperates with the similarly shaped valve seat 16' of the body 14'. The stem of the valve element 15', in this instance, is composed of an elongated stem member 55 of uniform cross-section which has three equally angularly spaced wings or legs 56, member 55 being integrally connected to the head 54. The valve element 15', that is, the head 54 and the stem 55, may be made of neoprene or Buna N having a suitable durometer rating for the purpose at hand. Thus, the valve element 15', for instance, may have a durometer rating on the Shore A Scale of 55 ± 5, as in the first embodiment.

The valve element 15' is retained in position as shown in FIG. 6 and is yieldably thrust to the left in order sealingly to engage the valve seat 16', 17' by a split crimp structure 57 which is the same as that of the two later embodiments shown in FIG. 8, on the one hand, and FIGS. 9 and 10, on the other, to be described. In forming such crimp structure, the rear end of the valve body is initially diametrally divided by a slot of substantial width, the thus-formed wings 59 at the rear end of the valve body being permanently deformed, after insertion of the valve element 15' into the valve body, by being inwardly compressed and thrust axially forwardly. As before, such operation may take place in the cold, that is, at ambient temperature, and results in a crimped structure which is permanent and stable under conditions of use.

The valve body and valve element are of such diameters and lengths, and the crimped structure 57 is so formed that the stem 55 is engaged and locally deformed by the crimped wings 59 at zone 60 as shown in FIG. 6. Upon the opening of the valve by the thrusting of the valve element to the right (FIG. 6), the deformation of the stem 55, particularly at the zone 60, is increased.

The embodiment of the valve shown in FIG. 8, there designated 10'', has a body 14' which is the same as that in FIGS. 6 and 7. The valve element 15'' differs from that of FIGS. 6 and 7 by having an axially compressible molded corrugated tube-like intermediate stem portion or bellows 64. The portion 64 has a rear sleeve-like portion 65 having coaxial circular cylindrical inner and outer surfaces. The rear outer edge of portion 65 is engaged and locally deformed by the crimped over wings 59 of the crimped structure 57, the portion 64 simultaneously being subjected to a desired degree of axial compression.

The valve 10''' of FIGS. 9 and 10 has a body 14''', which is generally the same as that in previous embodiments, and a crimped rear end structure 57 which is the same as those in FIGS. 6, 7, and 8. In this embodiment, the valve element 15''' has a head portion 69 to which the forward part 39''' is attached, and to which the stem portion 70, in the form of a hollow tube, is also integrally attached. The stem 70 is, in this instance, shown offset at a number of serially disposed points, so that in the longitudinal axial plane of FIG. 9, a bulge 71 is laterally opposite a concave portion 72. The wings 59 of the crimped structure 57 engage and locally deform the stem 70 at zones 74 so as constantly to thrust the valve element 15''' into closed position, that is, toward the right in FIG. 9. Upon the opening of the valve by thrusting the valve element to the left, not only is the deformation of the valve element at the zone 74 increased, but the waviness or deformation of the zones 71, 72 is also increased.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

What is claimed is:

1. A two-piece check valve having a sleeve-like outer valve body with a longitudinally extending passage therethrough, a valve element reciprocable longitudinally relative to the valve body within the passage therein, cooperating valve seats in the passage in the valve body and on the valve element, respectively, the main portions of the surface of the passage in the body of the valve and the outer surface of the valve element being spaced radially from each other, the valve having interengaging angularly spaced guide means on the valve body and valve element extending through a substantial part of the axial length of the valve element, said guide means maintaining the valve element concentric with the valve body, concentric longitudinally extending axially compressible resilient valve element-biasing means, and abutment means on the valve body compressively engaging the rear end of the biasing means constantly to urge the valve element toward valve closed position, the abutment being a radially inwardly crimped circumferentially continuous rear end wall portion of the valve body having angularly spaced zones folding radially inwardly to overlie overlying the rear end of the biasing means.

2. The valve of claim 1, wherein the abutment has equally angularly spaced zones which are partially folded on themselves in a forward direction, said spaced folded zones having uniformly spaced peaks compressively engaging the rear end of the biasing means, opposite confronting edges of the folded wall portion being substantially radially spaced from each other, the areas between the folded zones forming fluid flow channels.

3. A valve according to claim 1, wherein the crimped rear part of the valve body containing said folded zones is of reduced wall thickness as compared to the remainder of the valve, the rear part of the valve body being initially joined to the remainder of the valve body at an abrupt external annular shoulder.

4. A valve having a sleeve-like valve body with a longitudinally extending passage therethrough, a valve element reciprocable longitudinally relative to the valve body within the passage therein, cooperating valve seats in the passage in the valve body and on the valve element, respectively, the main portions of the surface of the passage in the valve body and the outer surface of the valve element being spaced radially from each other, the valve having interengaging guide means on the valve body and valve element extending through a substantial part of the axial length of the valve element, said guide means maintaining the valve element concentric with the valve body, said guide means comprising radially projecting lands on one of the members consisting of the valve body and valve element slidably engaging the other of said members, the valve element being rotatable about its longitudinal axis with respect to the valve body, the lands being on the valve element and slidably engaging the wall of the passage through the valve body, longitudinally extending grooves in the side wall of the valve body paralleling the lands on the valve element, the lands being equally angularly spaced about the axis of the valve body, and the numbers of lands and grooves being different.

5. A valve according to claim 4, wherein the lands have a circumferential width substantially greater than the circumferential width of the grooves, whereby substantially equally angularly spaced engaging guiding zones between the valve body and valve element are assured in all positions of turning of the valve element relative to the valve body about their common longitudinal axis.

* * * * *